United States Patent
Ueda et al.

(10) Patent No.: US 10,363,661 B2
(45) Date of Patent: Jul. 30, 2019

(54) CONTROL DEVICE, ROBOT, AND ROBOT SYSTEM

(71) Applicant: Seiko Epson Corporation, Tokyo (JP)

(72) Inventors: Junya Ueda, Azumino (JP); Masakazu Kobayashi, Shiojiri (JP); Yasuhiro Shimodaira, Matsumoto (JP)

(73) Assignee: Seiko Epson Corporation (JP)

( * ) Notice: Subject to any disclaimer, the term of this patent is extended or adjusted under 35 U.S.C. 154(b) by 83 days.

(21) Appl. No.: 15/656,332

(22) Filed: Jul. 21, 2017

(65) Prior Publication Data
US 2018/0029234 A1  Feb. 1, 2018

(30) Foreign Application Priority Data

Jul. 27, 2016 (JP) ................................. 2016-147092
Apr. 17, 2017 (JP) ................................. 2017-081131

(51) Int. Cl.
| G05B 15/00 | (2006.01) |
| G05B 19/00 | (2006.01) |
| B25J 9/16  | (2006.01) |
| B25J 13/08 | (2006.01) |
| B25J 15/00 | (2006.01) |

(52) U.S. Cl.
CPC ........... *B25J 9/1687* (2013.01); *B25J 9/1633* (2013.01); *B25J 13/085* (2013.01); *B25J 15/0019* (2013.01); *G05B 2219/39529* (2013.01); *G05B 2219/40072* (2013.01); *G05B 2219/45091* (2013.01)

(58) Field of Classification Search
CPC .... B25J 13/085; B25J 15/0019; B25J 9/1633; B25J 9/1687; G05B 2219/39529; G05B 2219/40072; G05B 2219/45091
See application file for complete search history.

(56) References Cited

U.S. PATENT DOCUMENTS

| 2012/0317535 A1* | 12/2012 | Schmirgel | B25J 9/1671 717/100 |
| 2013/0151061 A1* | 6/2013  | Hong      | B08B 9/08 701/25 |
| 2015/0019011 A1* | 1/2015  | Namba     | B25J 9/1687 700/248 |

FOREIGN PATENT DOCUMENTS

JP   07-214435 A   8/1995

OTHER PUBLICATIONS

D.M. Gorinevsky et al., Force Control of Robotics Systems, published by CRC Press LLC of Boca Raton, Florida, USA, 1997, pp. 200-219 and 283-305.
Extended European Search Report for Patent Application No. EP 17182971.6, dated Mar. 23, 2018 (9 pages).

* cited by examiner

*Primary Examiner* — Harry Y Oh
(74) *Attorney, Agent, or Firm* — Harness, Dickey & Pierce, P.L.C.

(57) ABSTRACT

A control device which controls a robot having a moving part includes: a processor which is configured to cause an end effector provided on the moving part to move an insertion object, bring the insertion object into contact with an insertion hole provided in an insertion target object in the state where the insertion object is tilted from a center axis of the insertion hole, and subsequently insert the insertion object into the insertion hole.

5 Claims, 8 Drawing Sheets

CONTROL DEVICE, ROBOT, AND ROBOT SYSTEM

BACKGROUND

1. Technical Field

The present invention relates to a control device, a robot, and a robot system.

2. Related Art

For an automatic screw tightening device which performs a screw tightening operation, a configuration in which a target attitude of a bit of a screw tightening mechanism is set on the same line as the vector of a force applied at the time of screw tightening is known (see JP-A-7-214435).

In the related-art technique, in some cases, it is difficult to insert a screw into a screw hole. For example, with a tapered screw hole, when the screw comes into contact with the taper and the vector of a force comes in the direction of a normal line to the taper, the screw faces in the direction of the normal line to the taper. Therefore, it is difficult to insert the screw into the screw hole. Also, for example, in the case where another component exists on the center axis of a screw hole (for example, line D in FIG. 9, as described in detail later), it is difficult to bring a screw and a screwdriver closer to the screw hole along the center axis of the screw hole and insert the screw into the screw hole. If the screw is forced into the screw hole, the component and the screwdriver will interfere with each other, posing a risk of damaging the component.

SUMMARY

A control device according to an aspect of the invention which controls a robot having a moving part includes: a control unit which causes an end effector provided on the moving part to move an insertion object, bring the insertion object into contact with an insertion hole provided in an insertion target object in the state where the insertion object is tilted from a center axis of the insertion hole, and subsequently insert the insertion object into the insertion hole.

With this configuration, the probability of failure to insert the insertion object into the insertion target object can be reduced. For example, even if another component exists on the center axis, the insertion object can be brought closer to and inserted into the insertion hole, using a position which avoids the component. Also, for example, even if the opening of a screw hole as an insertion hole is tapered, the inability to move due to a force in the direction of a normal line to the taper can be eliminated and a screw as an insertion object can be inserted into the screw hole.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described in the following order, referring to the accompanying drawings. The same components in the respective drawings are denoted same reference numbers, and the same explanation is not repeated.
(1) Configuration of Robot
(2) Configuration of Control Device
(3) Screw Insertion Processing
(4) Suggested Position
(5) Other Embodiments

(1) Configuration of Robot

Figure 1:
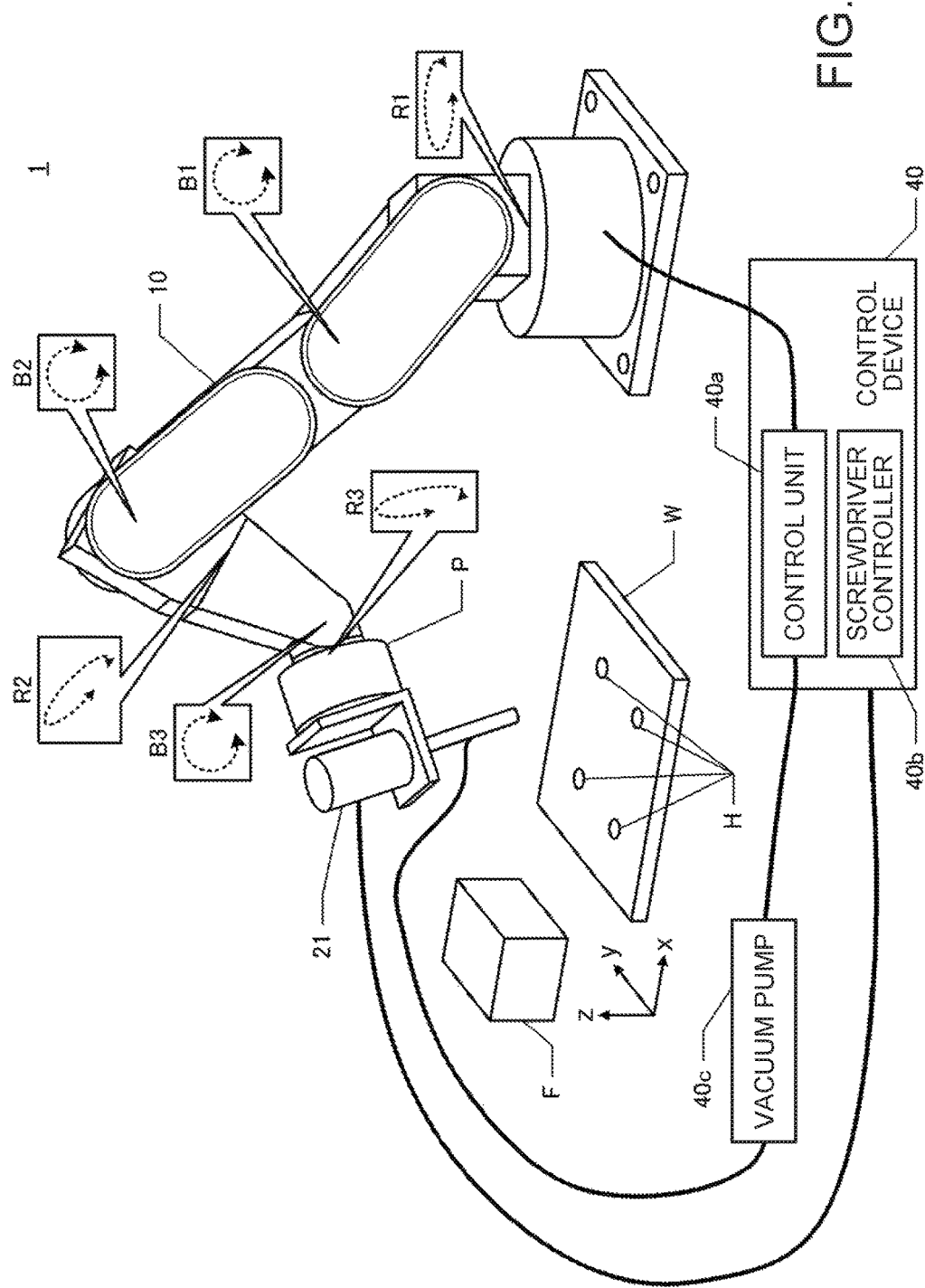
FIG. 1 is a perspective view of a robot.

FIG. 1 is a perspective view of a robot 1 according to an embodiment of the invention. As shown in FIG. 1, the robot 1 has an arm 10 and an end effector. The arm 10 is a 6-axis arm having three bend joints B1 to B3 and three roll joints R1 to R3. The bend joints B1 to B3 are joints at which components forming the arm 10 rotate to and from each other about an axis orthogonal to the direction of the length of the arm 10. The roll joints R1 to R3 are joints at which components forming the arm 10 rotate to and from each other about an axis in the direction of the length of the arm 10. The arm 10 has a motor (not illustrated) as a drive unit for actuating the bend joints B1 to B3 and the roll joints R1 to R3.

The end effector including a screwdriver 21 is attached to the distal end of the arm 10. The end effector is provided with a force sensor P situated between the screwdriver 21 and the arm 10. The force sensor P is a sensor which outputs a force and torque corresponding to forces on three axes acting on the force sensor P and torques acting around the three axes. In this embodiment, the screwdriver 21 is provided on a surface on one side of the force sensor P (surface on the side opposite to the arm 10). Therefore, the force sensor P can output a force and torque corresponding to forces on three axes acting on the screwdriver 21 and torques acting around the three axes.

The screwdriver 21 has a bit. If the air pressure within a cylindrical cover provided around the bit is lowered, a screw can be sucked toward the bit (not illustrated in FIG. 1). Therefore, in the state where the screw is sucked to the screwdriver 21, the force and torque acting on the screw is substantially equal to the force and torque acting on the screwdriver 21. When a force and torque acts on the screw sucked to the bit, the force sensor P can also output a force and torque corresponding to the force and torque acting on the screw. The force and torque applied to an external object when the screwdriver 21 or the screw comes in contact with the external object is a physical quantity in a different direction from and with the same magnitude as the force and torque acting on the screwdriver 21 or the screw from the external object. Therefore, the force sensor P can be regarded as detecting either of them. However, here, an example in which the force sensor P outputs the force and torque applied to the external object from the screwdriver 21 or the screw will be described.

Moreover, the screwdriver 21 can rotate the screw by rotating the screw sucked to the bit. Therefore, if the screw is arranged in an opening of a screw hole and the bit of the screwdriver 21 is rotated, the screw is inserted into the screw hole. The arm 10 can arrange the screwdriver 21 in a predetermined range and set the screwdriver 21 in a predetermined attitude (angle) by rotating the joints B1 to B3 and R1 to R3. In this embodiment, a work space of the arm 10 is provided near the installation space of the robot 1. Thus, a workpiece W having a screw hole H can be carried by a carrier, not illustrated, and can be fixed in the work space. A screw feeder F is arranged in the work space. The robot 1 can feed a screw to the screwdriver 21 by moving the distal end of the screwdriver 21 to the feeder F and causing the screw to be sucked to the bit.

The robot 1 can change the position and attitude of the screwdriver 21 by driving the arm 10 based on an output from the force sensor P. In the embodiment, if the robot 1 moves the screwdriver 21 in the state where the screw is sucked to the bit of the screwdriver 21, the screw moves along with the screwdriver 21 to an arbitrary position. The robot 1 also moves the screw to the opening of the screw hole H in the state where the screw is sucked to the screwdriver 21, and inserts the screw into each screw hole H in the workpiece W by rotating the screw with the bit. Therefore, in the embodiment, the insertion object is the screw, and the insertion target object is the workpiece W. The insertion hole is the screw hole H. The moving part is the arm 10.

(2) Configuration of Control Device

In the embodiment, the robot 1 is controlled by a control device 40. Therefore, the robot 1 and the control device 40 form a robot system. The control device 40 includes a control unit 40a and a screwdriver controller 40b. The control unit 40a and the screwdriver controller 40b have a program execution unit (a processor, a random access memory, a read-only memory and the like), not illustrated. The control unit 40a and the screwdriver controller 40b also input and output signals via an interface, not illustrated. As a power source for the robot 1 and the screwdriver 21, various power sources can be used. In the embodiment, the control unit 40a is supplied with electricity from a utility grid and supplies electricity to each motor provided for the arm 10. The screwdriver 21 is supplied with electricity from a utility grid.

The control unit 40a supplies a control signal and electricity for controlling each motor provided for the arm 10, based on an output from the force sensor P attached to the end effector of the robot 1. The control unit 40a is also connected to a vacuum pump 40c. The vacuum pump 40c can lower the air pressure in the cover of the screwdriver 21 and is driven in response to a control signal outputted from the control unit 40a. That is, the control unit 40a can control the suction of the screw to the bit of the screwdriver 21 by controlling the vacuum pump 40c. Moreover, the screwdriver controller 40b outputs a control signal for controlling the rotation or the like of the bit to the screwdriver 21 attached to the force sensor P of the robot 1. Also, the screwdriver 21 outputs a signal indicating the torque acting on the bit.

Figure 2:
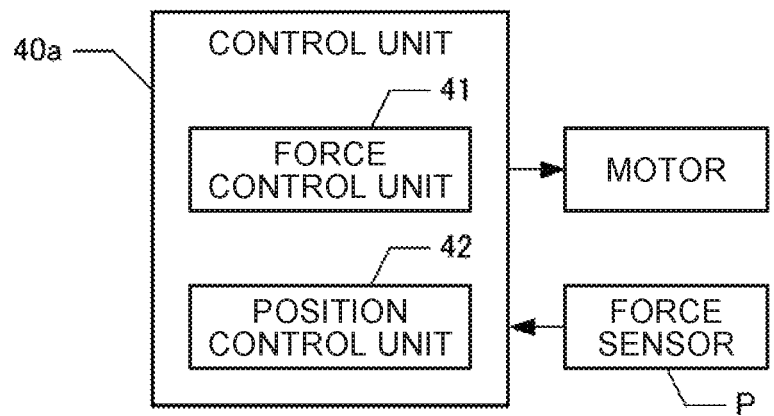
FIG. 2 is a functional block diagram of a control unit.

Next, the configuration of the control unit 40a will be described in more detail. FIG. 2 is a functional block diagram of the control unit 40a. The control unit 40a drives the robot 1 by executing a predetermined program. A force control unit 41 and a position control unit 42 schematically express the function realized by this program.

In the embodiment, the control unit 40a outputs a control signal to motors corresponding respectively to the bend joints B1 to B3 and the roll joints R1 to R3 of the arm 10. The force control unit 41 controls each joint of the arm 10 in such a way that the output from the force sensor P provided on the end effector reaches a target force. That is, the force control unit 41 acquires the output from the force sensor P and detects the force applied to another object by the screwdriver 21 (or the screw). If the detected force is not the target force, the force control unit 41 calculates an amount of driving of the arm 10 (amount of control of the motors) that is necessary for realizing the state where the target force is detected, and outputs a control signal to the motors, thus actuating the motors according to the amount of control. The amount of control of the motors may be decided by various methods. For example, the amount of control may be decided through impedance control. Of course, the force control unit 41 may also control the arm 10 in such a way that the torque outputted from the force sensor P reaches a target torque.

The position control unit 42 controls each joint of the arm 10 in such a way that the position of a preset TCP (Tool Center Point, a reference site which moves with the arm 10) reaches a target position and that the attitude of a site having the TCP becomes a target attitude. That is, in the robot 1, the position of the TCP is defined on a predetermined robot coordinate system (orthogonal xyz coordinate system shown in FIG. 1). The attitude of the site having the TCP is decided based on the directions of axes of a local coordinate system which has its origin at the TCP and is fixed to the screwdriver 21. The local coordinate system can be defined in various ways. For example, the local coordinate system can be defined by one axis in the direction in which the bit extends and two axes perpendicular to that direction.

Figure 3:
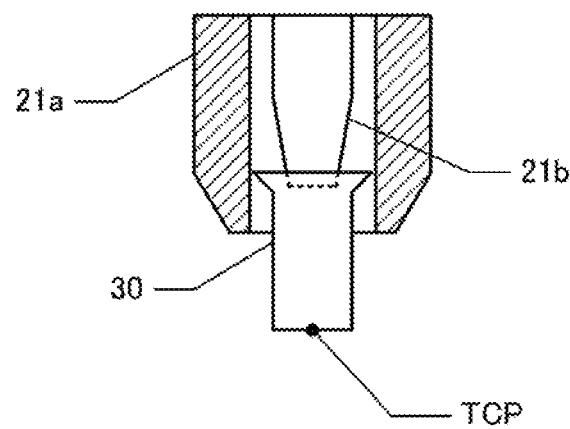
FIG. 3 shows a cover and bit of a screwdriver.

The TCP can be set at various sites. However, in the embodiment, the TCP is set at the center point of the distal end of the crew attached to the bit of the screwdriver 21. FIG. 3 shows a cylindrical cover 21a provided on the screwdriver 21. In FIG. 3, the cover 21a is illustrated as being cut in the direction in which a bit 21b extends, and is shown along with the bit 21b and a screw 30.

The operation of each arm 10 that is necessary for the TCP to be situated at an arbitrary coordinate point and be in an arbitrary attitude within a movable range is specified in advance. When a target position and a target attitude of the TCP on the robot coordinate system are specified, the position control unit 42 calculates the amount of driving of the arm 10 (amount of control of the motors), based on the target position and the target attitude. The position control unit 42 then outputs a control signal to the motors and thus actuates the motors according to the amount of control. Of course, in this control, the amount of control of the motors may be acquired by feedback control such as PID (Proportional-Integral-Derivative) control.

With the foregoing configuration, the control unit 40a can control the arm 10 in such a way that the force applied to another object by the screwdriver 21 or the screw 30 reaches a target force. Also, the control unit 40a can move the TCP of the screw 30 attached to the screwdriver 21 to the target position and cause the screwdriver 21 to take a target attitude, using the TCP as the reference point.

(3) Screw Insertion Processing

Figure 4:
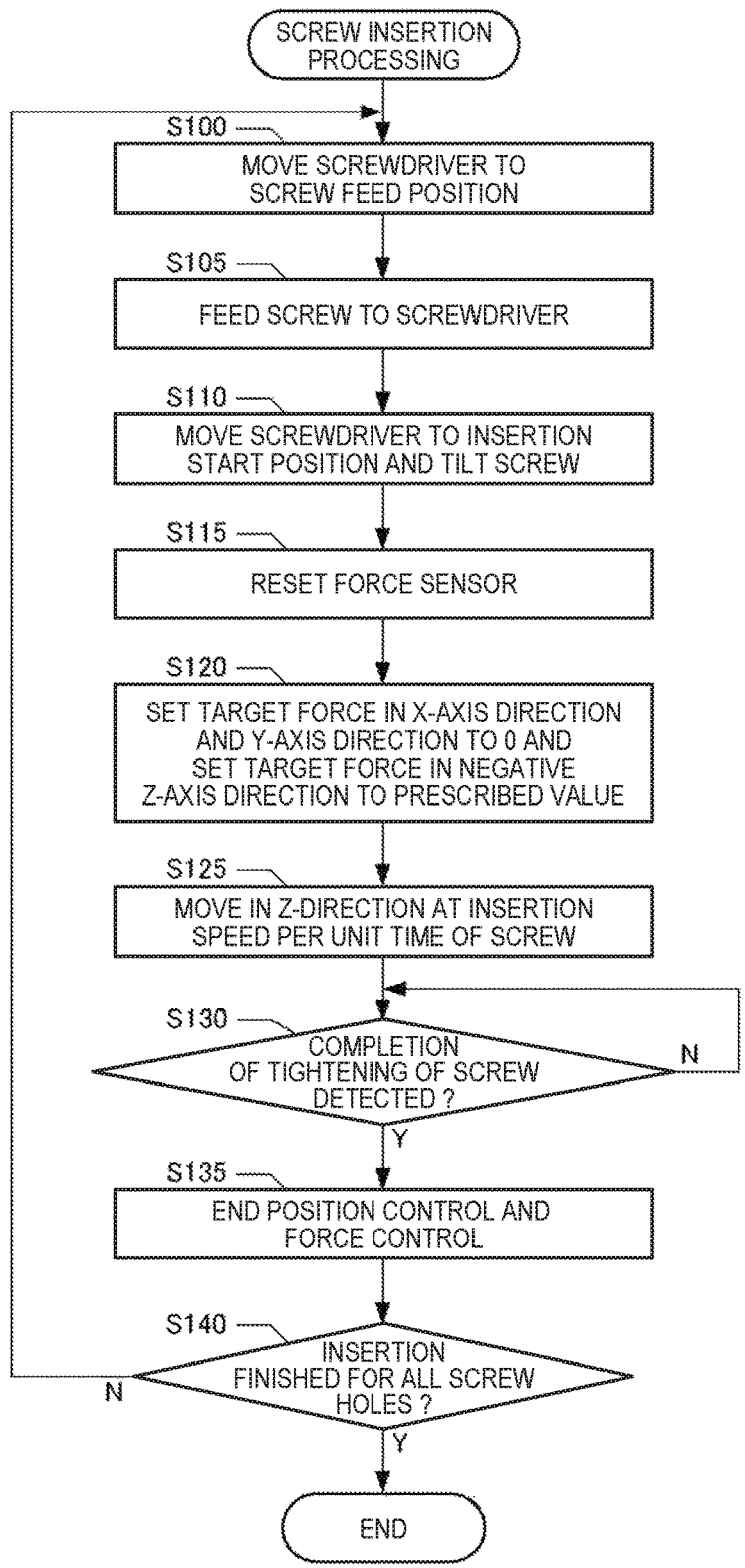
FIG. 4 is a flowchart of screw insertion processing.

Next, screw insertion processing when the control device 40 controls the robot 1 to insert and tighten the screw 30 into the screw hole H in the workpiece W in the embodiment will be described. FIG. 4 is a flowchart showing the screw insertion processing. Before the screw insertion processing is started, a target position, a target attitude and the like that are needed during the processing are suggested in advance. That is, in the embodiment, the robot 1 is supplied with the screw 30 from the feeder F and repeats the work of moving the screw 30 to the screw hole H in the workpiece W in the state where the screw 30 is sucked to the screwdriver 21 and inserting the screw 30 into the screw hole. In order for the robot 1 to be able to execute this work, a start position of each part of the work is suggested as a suggested position, and an attitude at the start position is suggested as a suggested attitude.

As the control unit 40a starts the screw insertion processing in the state where such suggestions are made, the position control unit 42 first moves the screwdriver 21 to a screw feed position (Step S100). That is, the position control unit 42 outputs a control signal to the motors and thus drives the arm 10 to move the screwdriver 21 to the suggested position above the feeder F of the screw 30 (positive z-axis direction). The position control unit 42 also outputs a control signal to the motors and thus drives the arm 10 to put the screwdriver 21 in the suggested attitude.

Next, the position control unit 42 supplies the screw 30 to the screwdriver 21 (Step S105). That is, the position control unit 42 outputs a control signal to the motors and thus drives the arm 10 to bring the opening of the cover 21a of the screwdriver 21 closer to the screw 30 on the feeder F. Also, the control unit 40a outputs a control signal to the vacuum pump 40c and thus causes the air pressure inside the cover 21a of the screwdriver 21 to be lowered. Consequently, the screw 30 is sucked toward the bit 21b.

Next, the position control unit 42 moves the screwdriver 21 to an insertion start position and tilts the screw 30 (Step S110). That is, a plurality of screw holes H is formed in the workpiece W shown in FIG. 1, and a position above each screw hole H is suggested as the start position for the work at the time of inserting the screw 30 into each screw hole H. Then, the position control unit 42 selects a screw hole H in which the screw 30 is not inserted yet, from among the plurality of screw holes H in the workpiece W. The position control unit 42 outputs a control signal to the motors and thus drives the arm 10 to move the screwdriver 21 to the position suggested as the insertion start position for the screw 30 to be inserted into the selected screw hole H.

Figure 5:
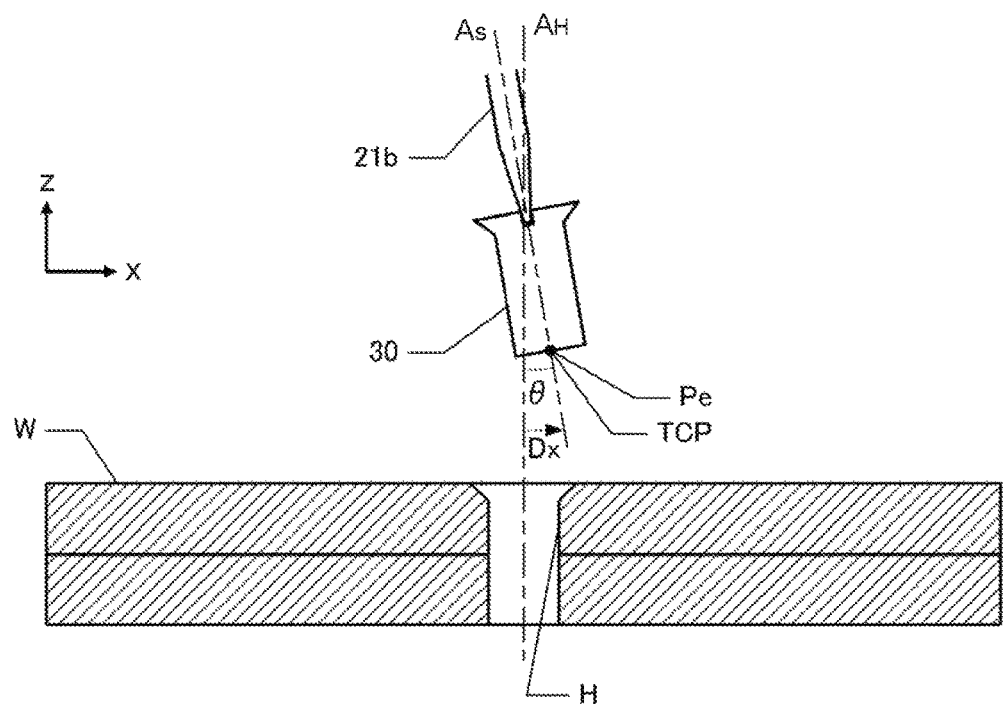
FIG. 5 schematically shows an insertion start position and attitude of a screw.

The position control unit 42 also outputs a control signal to the motors and thus drives the arm 10 to put the screwdriver 21 in the suggested attitude. In the embodiment, the suggested attitude is an attitude tilted from the center axis of the screw hole H. FIG. 5 schematically shows the insertion start position and the attitude before the work of inserting the screw 30 into the screw hole H in the workpiece W is started (where the cover 21a is illustrated). As shown in FIG. 5, the insertion start position is set to a position where the probability of the distal end of the screw 30 entering the screw hole H is high when the screw 30 is moved in the negative z-axis direction from the insertion start position. Also, a tilt angle is set in such a way that the center axis $A_S$ of the screw 30 is tilted by an angle θ (for example, 7 degrees) from the center axis $A_H$ of the screw hole H. The movement of the screwdriver 21 to the insertion start position and the tilting may be carried out simultaneously, or one of them may be carried out first.

After the screwdriver 21 is moved to the insertion start position and the screw 30 is tilted, the control unit 40a outputs a control signal to the force sensor P and thus resets the force sensor P (Step S115). That is, the force sensor P is reset so that the result of output from the force sensor P becomes a prescribed value (for example, 0) when the attitude set in Step S110 is taken.

Next, the force control unit 41 sets target forces in the x-axis direction and the y-axis direction to 0 and sets a target force in the negative z-axis direction to a prescribed value (Step S120). That is, the force control unit 41 acquires forces Fx (N), Fy (N) and Fz (N) in the x-axis direction, the y-axis direction and the z-axis direction, based on the output from the force sensor P. The force control unit 41 then controls the arm 10 in such a way that the resultant force on the x-y plane becomes 0, based on Fx and Fy. In the embodiment, the direction in which the screw 30 advances along the center axis of the screw hole H when the screw 30 is inserted into the screw hole H is the insertion direction. Therefore, in the embodiment, the negative z-axis direction is parallel to the insertion direction, and the x-axis direction and the y-axis direction are orthogonal to the insertion direction.

Specifically, if Fx and Fy are not 0, the force control unit 41 calculates an amount of driving of the arm 10 (amount of control of the motors) that is necessary for both Fx and Fy, which are the output from the force sensor P, to be 0. The force control unit 41 then outputs a control signal to the motors and thereby causes the motors to operate according to the amount of control. The output from the force sensor P thus becomes 0.

Figure 7:
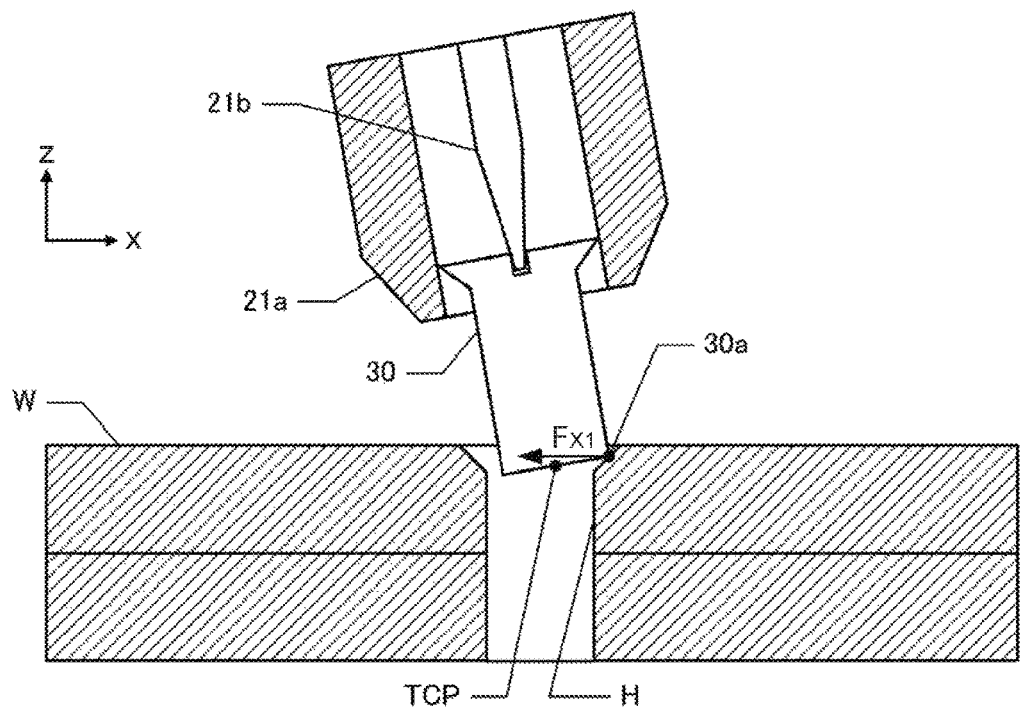
FIG. 7 shows a force acting on a screw.

FIG. 7 shows an example in which the resultant force on the x-y plane is Fx1 (that is, Fy=0). That is, in the example shown in FIG. 7, the screw 30 is in contact with the taper formed in the opening of the screw hole H (end part in the positive z-axis direction), at a contact point 30a. As the screw 30 moves in the insertion direction (negative z-axis direction), the screw 30 receives a reaction from the taper. Here, as an example, it is assumed that the reaction received by the screw 30 from the contact point 30a is a force with the magnitude of Fx1 directed in the negative x-axis direction.

As shown in FIG. 7, since the screw 30 is sucked to the bit 21b due to a reduction in air pressure inside the cover 21a, the force Fx1 acting on the screw 30 is transmitted to the force sensor P via the bit 21b and the cover 21a. The reaction acting on the screw 30 from the contact point 30a and the force applied to the contact point 30a by the screwdriver 21 are forces in the opposite directions and with the same magnitude. Therefore, the force sensor P outputs Fx=Fx1 (force in the x-axis direction) and Fy=0. In this case, the force control unit 41 outputs a control signal to the motors and thus drives the arm 10 to move the screwdriver 21 slightly in the direction opposite to Fx1 (that is, in the negative x-axis direction). Consequently, the contact point 30a of the screw 30 is moved away from the taper in the opening of the screw hole H. The moment the contact point 30a of the screw 30 is moved away from the taper, the force in the direction parallel to the x-y plane stops acting on the screw 30. Therefore, the output from the force sensor P becomes Fx=Fy=0. The force control unit 41 determines that the output from the force sensor P has achieved the target force, and suspends the control on the position or force in the direction parallel to the x-y plane.

In the process of such control, the force control unit 41 controls the arm 10 in such a way that the force Fz in the z-axis direction becomes a prescribed value. Specifically, the force control unit 41 calculates an amount of driving of the arm 10 (amount of control of the motors) that is necessary for the force Fz in the z-axis direction to become a force Fz1 with a prescribed magnitude (for example, 6 N) and directed in the negative z-axis direction. The force control unit 41 then outputs a control signal to the motors and causes the motors to operate according to the amount of control, thus adjusting the output from the force sensor P to become Fz1. The prescribed magnitude of the force Fz may be specified based on various elements. For example, the prescribed magnitude is decided based on the weight of the screwdriver 21, or the like.

Next, the position control unit 42 moves the screw 30 in the z-direction at the insertion speed per unit time of the screw 30 (Step S125). That is, in the embodiment, the screw 30 inserted into the screw hole H in the workpiece W is a crew manufactured according to prescribed standards, and its moving distance in the insertion direction per rotation, that is, the lead for the screw, is manufactured in conformity with standards. Therefore, if the rotation speed of the screwdriver 21 is decided, the speed of moving in the insertion direction when the screw 30 is inserted into the screw hole H while rotating at that rotation speed is decided.

Specifically, in the case where the lead for the screw 30 is L (mm/rotation) and the rotation speed per second of the screwdriver is R (rps), if the screw 30 is rotated at that rotation speed, the screw 30 is inserted into the screw hole H by a distance of R×L (mm) per second. Thus, in the embodiment, position control is performed in such a way that the screwdriver 21 moves in the negative z-axis direction (insertion direction) at the speed at which the screw 30 is inserted into the screw hole H.

Specifically, the screwdriver controller 40b outputs a control signal to the screwdriver 21 and thus causes the screwdriver 21 to rotate at the predetermined rotation speed R. The position control unit 42 acquires the product of the lead L for the screw 30 and the rotation speed R, as a velocity V. The position control unit 42 also outputs a control signal to the motors and thus drives the arm 10 to move the screwdriver 21 in the negative z-axis direction at the velocity V.

As the result of various controls, the position control unit 42 controls the moving speed of the screwdriver 21 (screw 30) to be the velocity V. Therefore, when moving the screwdriver 21 at a velocity vf in the insertion direction under the control of the force control unit 41, the position control unit 42 drives the arm 10 in such a way that the moving speed of the screwdriver 21 (screw 30) becomes the velocity V as the result of having the velocity V-vf added. For example, in the case where the velocity vf based on force control is obtained by ((target force in the z-axis direction–output from the force sensor P)/damper), if the output from the force sensor P changes because of the screw 30 coming in contact with the screw hole H, the velocity vf based on force control changes as well. The damper is a coefficient of virtual viscosity in impedance control or the like.

As a more specific example, in the case where, for example, the type of the screw 30 is M1, the lead L is 0.25 mm and the rotation speed R is 13.3 rps, the velocity V in the insertion direction at the time of force control is approximately 3.3 mm/sec (=13.3×0.25). In this case, as the numerical values of an impedance parameter (coefficient of virtual inertia m (N/(mm/s$^2$)) and a coefficient of virtual viscosity d (N/(mm/s)), an example may be employed in which m=0.001 and d=1 for Fx, m=0.001 and d=1 for Fy, and m=0.005 and d=5 for Fz are given. Also, an example may be employed in which the numerical value of an impedance parameter (coefficient of virtual elasticity k (N/mm)) is 0 for all (0 for Fx, 0 for Fy, and 0 for Fz) and in which the numerical value of the target force in the insertion direction is 3 (N).

Also, in the case where the type of the screw 30 is M1 to M39, the following example can be employed. That is, an example can be employed in which the speed in the insertion direction at the time of force control is 1 to 20 (mm/sec), in which the numerical values m (N/(mm/s$^2$)) and d (N/(mm/s)) of the impedance parameters (coefficient of virtual inertia m and coefficient of virtual viscosity d) are m=0.0005 to 0.002 and d=0.5 to 2 for Fx, m=0.0005 to 0.002 and d=0.5 to 2 for Fy, and m=0.001 to 0.01 and d=1 to 10 for Fz, in which the numerical value of the impedance parameter (coefficient of virtual elasticity k (N/mm)) is 0 for all, and in which the numerical value of the target force in the insertion direction is greater than 0 (N) and equal to or below 40 (N).

Figure 6:
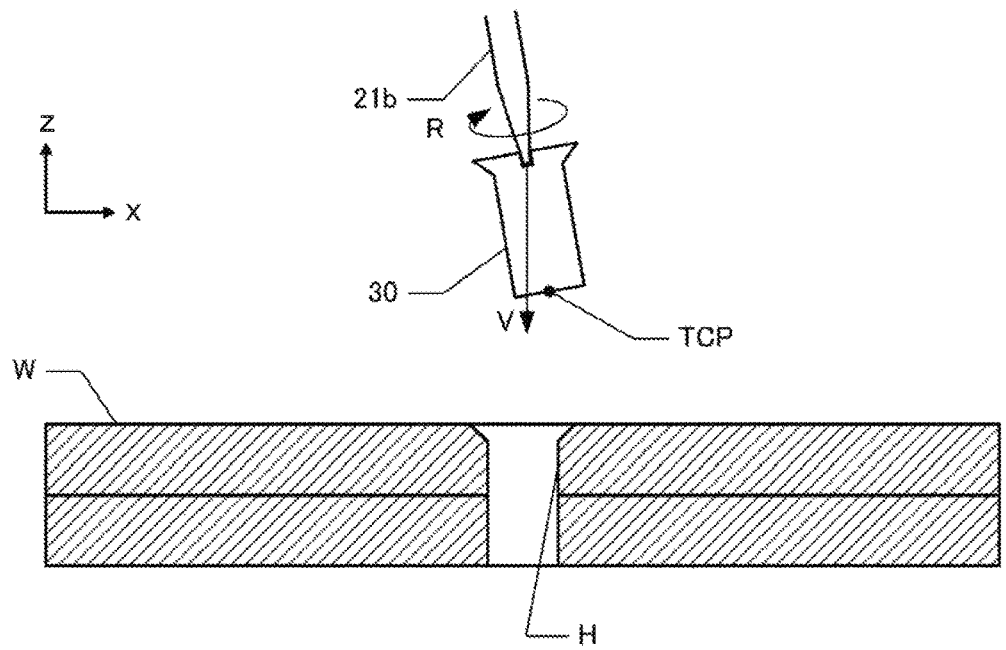
FIG. 6 shows an operation at the time of inserting a screw.

The position control unit 42 controls the moving speed of the screwdriver 21 (screw 30) according to the change and causes the moving speed of the screwdriver 21 (screw 30) to be the velocity V. With this configuration, the TCP set at the distal end of the screw 30 moves in the negative z-axis direction at the velocity V while the bit 21b rotates at the rotation speed R, as shown in FIG. 6. In FIG. 6, the cover 21a is not illustrated. In the speed control, it suffices that the velocity is controlled to be V when the screw 30 is inserted. A control may be employed in which the sum of the velocity based on position control and the velocity based on force control allows movement at V+Vf and in which the moving speed becomes V when the screw 30 comes in contact with another object or when the force acting in the z-axis direction has reached a target force. Various configurations can be employed.

When the screw 30 has reached the screw hole H and the thread of the screw 30 begins to mesh with the groove of the screw hole H, the screw 30 begins to be inserted into the screw hole H while rotating. Since the product of the lead L for the screw 30n and the rotation speed R of the screwdriver 21 is V, the screw 30 is inserted into screw hole H while the velocity V at which the screwdriver 21 moves in the negative z-axis direction is not changed. Of course, the movement of the screwdriver 21 at the velocity V may be executed while the screw 30 is inserted into the screw hole H. The screwdriver 21 may be moved at a higher velocity than the velocity V until immediately before the screw 30 reaches the screw hole H, and the speed of the screwdriver 21 may become the velocity V at the point when the screw 30 reaches the screw hole H.

In this way, in the control of this example, in Step S125, the screw 30 is moved along with the screwdriver 21 in the negative z-axis direction at the velocity V while the screwdriver 21 rotates. When the screw 30 comes in contact with another object, the arm 10 exerts the force Fz1 in the negative z-axis direction. Therefore, in the state where the screw 30 is meshed with the grooves of the screw hole H and where a force in the negative z-axis direction can be exerted on the screw 30, the force Fz1 in the negative z-axis direction continues acting on the screw 30, and with this, the screw 30 is rotated by the screwdriver 21. After the screw 30 comes in contact with the taper, when the screw 30 moves slightly to the side opposite to the taper within the x-y plane in order to cause the force in the direction of the x-y plane to be 0, the screw 30 moves in the negative z-axis direction. As the screw 30 moves in the negative z-axis direction, a force in the direction of the x-y plane acts again on the screw 30 from the taper. Therefore, control is performed to make this force 0, and the screw 30 moves slightly to the side opposite to the taper within the x-y plane.

Figure 8:
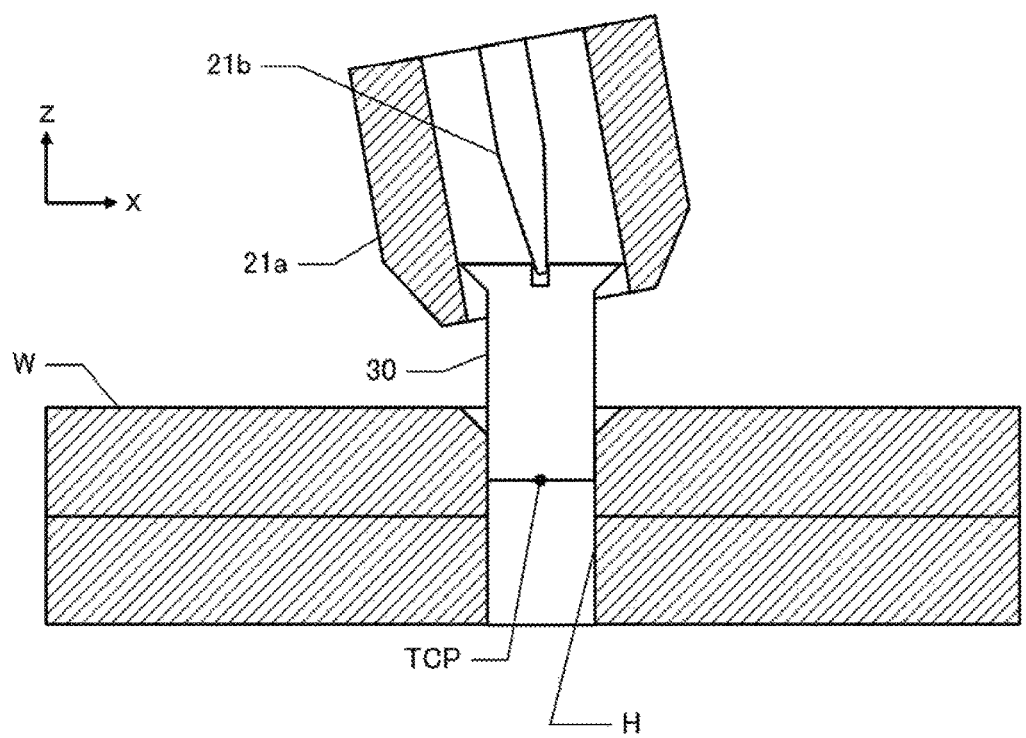
FIG. 8 shows a screw being inserted.

In the embodiment, this operation is repeated. Therefore, the screw 30 is gradually inserted in the negative z-axis direction while following the surface of the taper and then avoiding the taper. That is, profile control in which the screw 30 is inserted into the screw hole while being in contact with the wall surface of the screw hole is executed. When the distal end of the screw 30 reaches the part deeper than the taper, the screw 30 is inserted into the screw hole H as the screw 30 is rotated. That is, the arm 10 is moved in the negative z-axis direction and the attitude of the arm 10 does not change in this process. However, since the screw 30 meshes with the groove of the screw hole H, the tilt of the screw 30 from the center axis gradually decreases when the screw 30 reaches the deeper side than the taper. Eventually, the axis of the screw 30 becomes parallel to the center axis of the screw hole H while the screw 30 is inserted therein. FIG. 8 shows the process in which the distal end of the screw 30 is inserted to the deeper side than the taper (in the negative z-axis direction) of the screw hole H.

In the state where such control is executed, the screwdriver controller 40b determines whether the completion of the tightening of the screw is detected or not (Step S130). That is, the screwdriver controller 40b is capable of detecting a torque acting on the bit 21b, based on an output signal from the screwdriver 21, and detects that the tightening of the screw is completed if a toques equal to or above a prescribed threshold acts on the bit 21b for a prescribed period. In the screwdriver 21, the contact part between the screw 30 and the bit 21b is arranged on the inner side of the cover 21a (see, for example, FIG. 3). Therefore, the screwdriver 21 is configured in such a way that the bit 21b moves while pushing the screw 30 in the direction of the length of the bit 21b (or the cover 21a retreats to the side of the screwdriver 21 along the direction of the length of the bit 21b) before the tightening of the screw 30 is completed.

If it is not determined in Step S130 that the completion of the tightening of the screw is detected (if the screw 30 is not inserted fully in the insertion hole), the position control unit 42 and the force control unit 41 wait until it is determined that the completion of the tightening of the screw is detected (the control of Steps S120 and S125 is continued). If failure to tighten the screw is detected (for example, if it is detected that the screw 30 has come off the bit 21b) before the completion of the tightening of the screw is detected, the processing returns to, for example, Step S100 and processing for the same screw is carried out.

If it is detected in Step S130 that the completion of the tightening of the screw is detected, the position control unit 42 and the force control unit 41 end the position control and the force control (Step S135). Next, the control unit 40a determines whether the insertion of the screw 30 is finished for all of the screw holes H or not (Step S140). That is, since the number of the screw holes H formed in the workpiece W is decided in advance, the control unit 40a determines whether the insertion of the screw 30 is completed for all of the screw holes H or not, and repeats the processing of Step S100 and onward until it is determined that the insertion is completed for all of the screw holes H.

With the foregoing configuration, the probability of failure to insert the screw 30 into the screw hole H can be reduced. For example, with the related-art configuration in which the screw 30 is directed in the direction of a normal line to the force acting on the screw 30, when the screw 30 comes in contact with the taper of the screw hole H, the screw 30 may face in the direction of a normal line to the taper and become unable to move in some cases. However, according to the embodiment, the screw 30 is restrained from facing in the direction of a normal line to the taper. Also, in the embodiment, profile control is performed so that the screw 30 is inserted into the screw hole H, avoiding the taper, even when the screw 30 comes in contact with the taper. Therefore, the probability of failure to insert the screw 30 into the screw hole H can be reduced.

Figure 9:
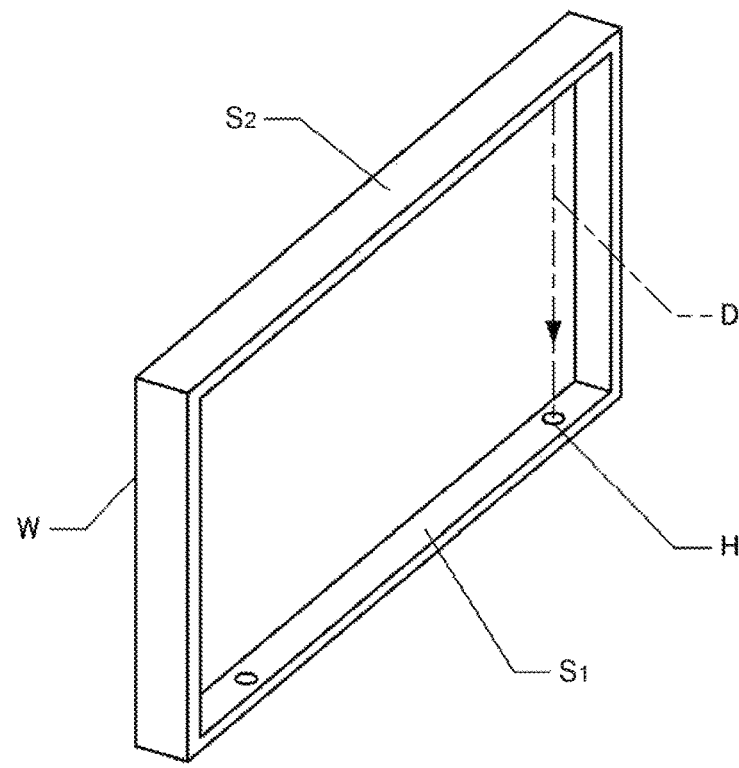
FIG. 9 shows an example of a workpiece in which a tilted screw is inserted.

Moreover, in the embodiment, the screw 30 in a tilted state is brought closer to the screw hole H. Therefore, even if another component exists on the center axis of the insertion hole, the screw 30 can be brought closer to the screw hole, using a position avoiding that component, and the screw 30 can be inserted into the screw hole. FIG. 9 shows an example of a workpiece W having such a screw hole H. As shown in FIG. 9, the workpiece W is in the shape of a hollow hexahedron with one side eliminated, and the screw hole H is formed in a lateral side $S_1$. Since the opposite lateral side $S_2$ exists on the center axis D of the screw hole H, it is difficult to arrange the screwdriver 21 and the screw 30 on the center axis of the screw hole H and insert the screw 30 into the screw hole H.

However, in the embodiment, the screw 30 in a tilted state can be brought closer to the screw hole H, and the screw 30 can be thus inserted into the screw hole H. Therefore, the screw 30 can be brought closer to and inserted into the screw hole H, avoiding the lateral side $S_2$ existing on the center axis of the screw hole H. When the screw 30 is thus tilted and is to be inserted into the screw hole H in the state where the axis of the screw 30 is not parallel to the center axis of the screw hole H, if the control by the force control unit 41 is absent, failure to insert the screw 30 due to the screw 30 coming into contact with the taper is considered likely. However, in the embodiment, with the control by the force control unit 41, the screw 30 can be moved deep into the screw hole H while avoiding the taper. Therefore, the screw 30 can be inserted into the screw hole H without increasing the probability of failure.

(4) Suggested Position

Next, the suggested position as the insertion start position for the screw 30 in the embodiment will be described in detail. In a robot which repeats prescribed work, normally, a position and attitude of a moving part at every important point of work is suggested. In a robot as an industrial product, an error can occur in the position of a moving part because of manufacturing errors and change with time or the like. The suggested position and the suggested attitude are normally specified based on various elements. However, generally, the suggested position and the suggested attitude are decided in such a way as to achieve the highest probability of success in the work.

Figure 10:
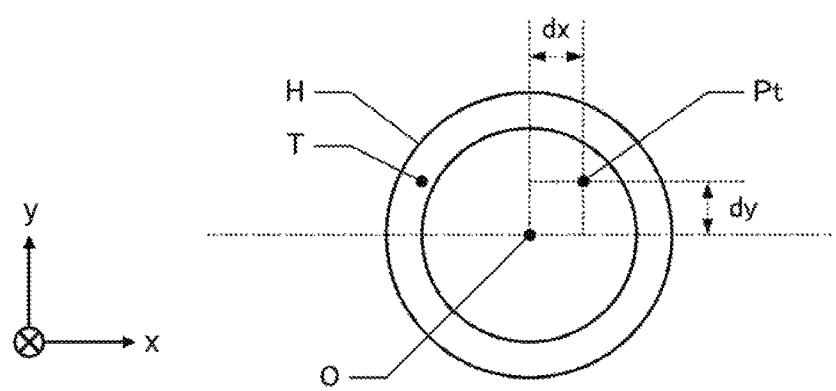
FIG. 10 shows a tapered screw hole, as viewed along its center axis.

In the work of inserting the screw 30 into the screw hole H, generally, an attitude of the screw 30 is suggested in such a way that the axis of the screw 30 becomes parallel to the center axis of the screw hole H. Also, a suggested position is set in such a way that the center of the screw 30 is arranged at the center when the screw hole H is viewed in a line-of-sight direction parallel to the center axis. FIG. 10 shows the state where a screw hole H having a taper T is viewed along the z-axis direction. In FIG. 10, the center in the case where the screw hole H is viewed in a line-of-sight direction parallel to the center axis (z-axis direction) is indicated by a reference sign O.

In the case where the screw 30 is not tilted from the center axis of the screw hole H, if the center O is set as the suggested position, the highest probability of success in the work of inserting the screw 30 is achieved. However, in the configuration in which the screw 30 in a tilted state is moved toward the screw hole H, the end part on the side of the screw hole H (end part on the side of the insertion hole; end part on the side opposite to the bit 21b) of the screw 30 can first come into contact with the taper, as shown in FIG. 7. Therefore, the center O is found to be not an ideal suggested position.

That is, a configuration in which a suggested position is set at a position displaced in a displacement direction from the center O is found to be preferable. Specifically, it is preferable that a direction in which the end part on the side of the screw hole H of the screw 30 is tilted from the center axis of the screw hole H is defined as a displacement direction, and that a position displaced in the displacement direction from the center O is the suggested position. Here, the direction in which the end part on the side of the screw hole H of the screw 30 is tilted from the center axis of the screw hole H is defined as a direction perpendicular to the center axis of the screw hole H. For example, in the example shown in FIG. 5, the tilting direction in which the end part Pe on the side of the screw hole H of the screw 30 (in this example, coincident with the TCP) tilts from the center axis $A_S$ is not the θ-direction (rotating direction about the center of rotation) but is defined within the x-y plane. Accordingly, in the example shown in FIG. 5, an arrow Dx indicated by a broken line is the tilting direction. Also, the end part Pe on the side of the screw hole H of the screw 30 may be one point on the side of the screw hole H and may be defined, for example, on the center axis $A_S$ of the screw 30 in such a way that a difference is made between the case where the center axis $A_S$ of the screw 30 exists on the center axis $A_H$ of the screw hole H and the case where the screw 30 is tilted.

The amount of displacement in the displacement direction can be specified, for example, by repeating the insertion operation with the screw displaced in various amounts of displacement and then acquiring statistics of success and failure, or the like. In FIG. 10, a position Pt in the case where an insertion operation is tried with the amount of displacement in the x-axis direction from the center O being dx and the amount of displacement in the y-axis direction being dy, is shown. Table 1 shows the result of repeating the operation of inserting the screw 30 into the screw hole H, using the position Pt thus displaced by dx in the x-axis direction and dy in the y-axis direction as the insertion start position, and then calculating the probability of the screw 30 being correctly inserted.

That is, in Table 1, the probability is calculated, with the amount of displacement changed by every 0.2 mm in the x-axis direction and in the y-axis direction. The screw 30 used in this example has a coarse thread of M1.2×2 mm and is made of SUS. The workpiece W is made of iron.

symmetrical distribution in the y-axis direction about dy=0.0 mm is observed (dx=−0.2 and dy=−0.2 are exceptions). For example, with dx=0.0 mm, a distribution of dy with which the success rate is 100% is over a range of −0.4 mm to 0.4 mm, and the center of the distribution is dy=0.0 mm. Therefore, it is preferable that the amount of displacement in the y-axis direction is 0.

Meanwhile, when the focus is placed on the distribution in the x-axis direction of the success rate with dy=0.0 mm, the distribution of dx with which the success rate is 100% is over a range of −0.2 mm to 0.8 mm. The center of the distribution with which the success rate is 100% is dx=0.3 mm. Therefore, if the position of dy=0.0 mm and dx=0.3 mm may be set as a suggested position, the highest success rate of the insertion of the screw 30 in the embodiment, where the screw 30 is tilted, can be achieved.

By employing the configuration as described above, in which the work of inserting the screw 30 using a position displaced in the displacement direction as the insertion start position is carried out a plurality of times at a plurality of positions, then a distribution of the amount of displacement with which the success rate is equal to or above a predetermined probability (in this example, this probability is 100%, but it may be 80% or the like) in the displacement direction is specified, and the center of the distribution (in this example, dx=0.3 mm) is defined as a suggested position, the screw 30 in a tilted state can be inserted into the workpiece W with a success rate equal to that in the case where the screw 30 is not tilted. The distribution of the amount of displacement with which the success rate is 100% in the case where the screw 30 is tilted is broader than the distribution of the amount of displacement with which the success rate is 100% in the case where the screw 30 is not tilted. Therefore, in the case where the screw 30 is tilted, even if the suggestion of the insertion start position is not strictly accurate, a higher probability of success in the insertion of the screw 30 can be achieved than in the case where the screw 30 is not tilted.

(5) Other Embodiments

The embodiment is simply an example to carry out the invention. Various other embodiments can be employed. For example, the control device may be built in the robot or may be provided in a different place from the installation place of the robot, for example, in an external server or the like. Also, the control device may be configured to control a plurality of robots. Of course, the control device may be arranged,

TABLE 1

| | | \multicolumn{9}{c}{dx (mm)} | | | | | | | | |
|---|---|---|---|---|---|---|---|---|---|---|
| | | −0.6 | −0.4 | −0.2 | 0.0 | 0.2 | 0.4 | 0.6 | 0.8 | 1.0 |
| dy (mm) | 0.6 | 60% | 0% | 0% | 0% | 0% | 0% | 0% | 0% | |
| | 0.4 | 60% | 80% | 60% | 100% | 100% | 100% | 80% | 40% | 0% |
| | 0.2 | 80% | 80% | 100% | 100% | 100% | 100% | 100% | 60% | 0% |
| | 0.0 | 0% | 20% | 100% | 100% | 100% | 100% | 100% | 100% | 0% |
| | −0.2 | | 0% | 0% | 100% | 100% | 100% | 100% | 20% | 0% |
| | −0.4 | | | 0% | 100% | 100% | 100% | 40% | 0% | |
| | −0.6 | | | | 0% | 0% | 0% | 0% | | |

Here, the focus is on the amounts of displacement with which the success rate is 100% in Table 1. When the focus is placed on the change in the amount of displacement in the y-axis direction with which the success rate is 100%, a distributed in a plurality of devices. For example, a part of the control device may be built in the robot and another part of the control device may be arranged in an external server outside the robot.

Moreover, a part of the configuration in the embodiment may be omitted. The order of processing may be changed and a part of the processing may be omitted. For example, the force sensor may be reset once for the work on a plurality of screws, instead of once for each screw.

Also, it suffices that the robot has a moving part and can realize an arbitrary function by operating the moving part. It suffices that the moving part is configured to move relatively to the installation position of the robot and change in attitude. The degree of freedom of the moving part (number of moving axes or the like) is arbitrary. It suffices that at least the insertion object can be tilted from the center axis of the insertion hole and inserted into the insertion hole in that state. Therefore, the configuration of the robot is not limited, and various numbers of axes, various numbers of arms and various configurations of the end effector can be employed.

It suffices that the moving part can move the insertion object with the operation of the moving part by being driven. Therefore, the insertion object may be configured to be attached to the moving part or to the end effector or the like provided at the moving part, and various forms of attachment can be employed. For example, a configuration in which the insertion object is attached to the moving part or to the end effector or the like provided at the moving part by a suction/attraction, gripping, holding or the like using air pressure or magnetism, or a combination of these, can be realized. Device for attaching the insertion object to the moving part (for example, a suction device, end effector or the like) may be provided in the moving part or may be attachable to/removable from the moving part.

The insertion target object may be any object having an insertion hole into which the insertion object is inserted. The insertion target object may have any shape, material and the like, provided that the insertion object can be inserted therein. The insertion target object may be arranged at a predetermined position before the operation of inserting the insertion object is started, and the insertion target object may take various attitudes. For example, in the example shown in FIG. 1, the attitude of the workpiece W as the insertion target object may be different from the attitude shown in FIG. 1, and the center axis of the screw hole H may face in the x-axis direction, the y-axis direction, or other directions.

The insertion hole may be any site into which the insertion object can be inserted. For example, a hole or the like formed in the insertion target object can be the insertion hole. Since the insertion hole has a shape that allows the insertion object to be inserted therein, the inner wall of the insertion hole has a shape which comes in contact with the outer wall of the insertion object, when the insertion hole is viewed in a line-of-sight direction parallel to the center axis of the insertion hole. However, in order to prevent the insertion object from moving within the insertion hole after the insertion object is inserted in the insertion hole, it is preferable that the inner wall of the insertion hole is slightly larger than and has the substantially the same shape as the outer wall of the insertion object.

The insertion direction in the insertion hole is the direction in which the insertion object is inserted when the insertion object is moved along the insertion direction. A direction of a straight line is mainly assumed, but a direction along a curve (for example, an insertion hole in which a part of a solid torus is inserted, or the like) may also be employed.

The insertion object may be any object inserted into the insertion hole in the insertion target object. The insertion object may have any shape, material and the like, provided that the insertion object can be inserted into the insertion hole. It suffices that the insertion object is movable by the moving part before being inserted into the insertion hole. The insertion object may be fed to the moving part by a feeder or the like. The insertion may be a part of the assembling or may be a part of the tightening. If the latter is carried out with a screw, the moving direction in which the insertion object moves for insertion is not only the insertion direction, and the insertion object can also move in the rotating direction about the center of the insertion hole.

It suffices that the tilt of the insertion object from the center axis is realized at least in the case where the insertion object comes in contact with the inner wall of the insertion hole. When the insertion of the insertion object into the insertion hole is started (for example, when an operation for tightening a screw is started), the insertion object may be tilted, or the tilted state may be ended. Also, the tilt angle may gradually approach 0. Of course, a configuration in which profile control is carried out in the case where the insertion object is not tilted from the insertion direction may be employed. In this case, too, the insertion object can be inserted into the insertion target object at a high probability of success.

It suffices that the control unit can control the moving part to move the insertion object and to change the attitude of the insertion object with the movement. Therefore, as the control unit, for example, a control unit which gives control instructions on deformation, rotation and the like to a plurality of moving parts with a degree of freedom and drives a drive unit such as a motor or actuator may be employed.

The control by the control unit may include the control of the moving part to carry out at least the movement of the insertion object, the adjustment of the attitude (tilting) of the insertion object, and the insertion of the insertion object into the insertion hole. This control can be realized by performing control in which at least one of the position and attitude of the moving part changes. Of course, various targets can be employed as control targets in the control. Position control to move the moving part and the insertion object to a target position, force control to cause the moving part and the insertion object to operate in such a way that the force acting on the moving part and the insertion object reaches a target force, acceleration control to cause the moving part and the insertion object to operate in such a way that the acceleration acting on the moving part and the insertion object reaches a target acceleration, or the like, may be employed. A combination of a plurality of kinds of control may be employed as well.

As a specific example of such control, a configuration may be employed in which the control unit performs control in such a way that the force acting on the insertion object in the insertion direction in the insertion hole becomes greater than the force acting in the direction orthogonal to the insertion direction, while the insertion object is inserted into the insertion hole. That is, the control unit can drive the moving part by performing control, and as the result of this driving, the position of the moving part and the force acting on the moving part change. With such control, the force acting on the insertion object can be controlled in such a way that the force acting in the insertion direction of the insertion object becomes greater than the force acting in the direction orthogonal to the insertion direction.

If a greater force than the force acting in the direction orthogonal to the insertion direction is exerted on the insertion object, a force to move the insertion object in the insertion direction, that is, a force to insert the insertion object into the insertion hole, can be exerted on the insertion object. If the force acting in the direction orthogonal to the insertion direction is 0, when the insertion object comes into contact with another object, the insertion object moves to the side opposite to that object. If the force acting in the direction orthogonal to the insertion direction is greater than 0, the insertion object can move in the orthogonal direction according to that force.

Figure 11:
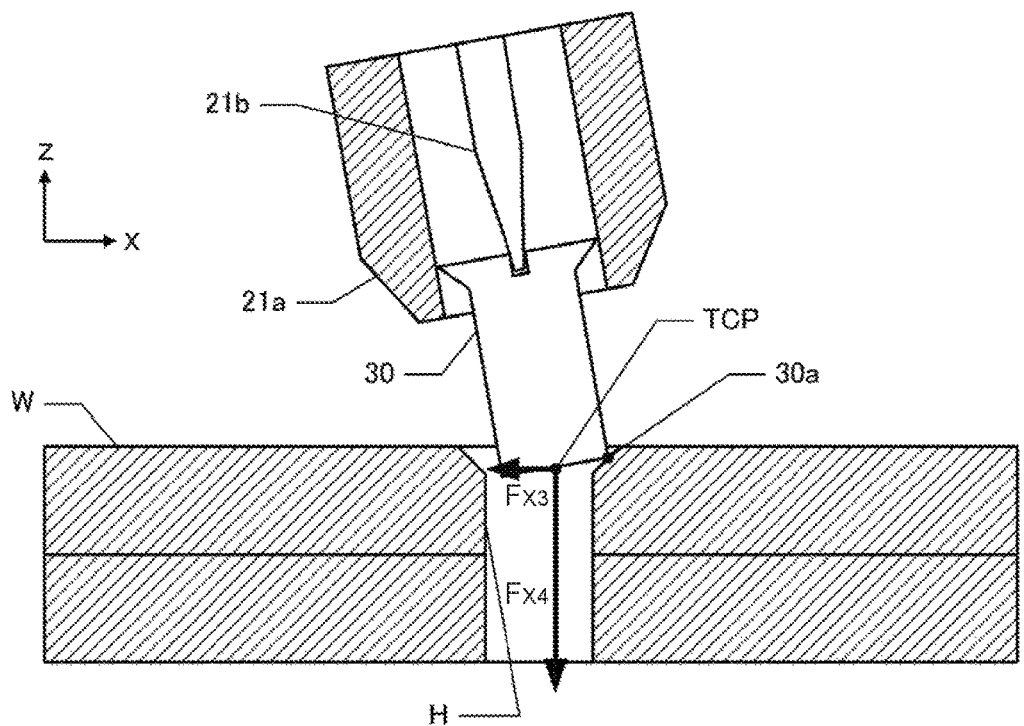
FIG. 11 shows a force acting on TCP from an arm.

In FIG. 11, in a state similar to that in FIG. 7, forces exerted on the TCP by the bit 21b with the driving of the arm 10 are shown as Fx3 and Fx4, instead of the force received by the screw 30 from another object. That is, with the driving of the arm 10, the force Fx4 in the z-direction acts on the bit 21b. Therefore, the bit 21b inserts the screw 30 into the screw hole H with the force Fx4.

Also, in this example, the arm 10 is controlled in such a way that the force in the x-direction acting on the bit 21b becomes Fx3 (the force in the y-direction being 0). If the force Fx3 is 0, even when the screw 30 comes in contact with the taper at the contact point 30a, the arm 10 is controlled in such a way as to cancel its reaction. Therefore, the screw 30 moves in such a way as to avoid the taper, move to the side opposite to another object when coming in contact with this another object, and thus avoid this another object. Also, if the force Fx3 greater than 0 directed in the same direction as the reaction received from the contact point 30a on the taper is exerted on the TCP, the arm 10 is controlled in such a way as to avoid an object such as the taper.

In this way, when the focus is placed on the insertion object, the state where the force acting in the insertion direction in the insertion hole is greater than the force acting in the direction orthogonal to the insertion direction can be realized with various target forces. That is, the force acting on an arbitrary site interlocked with the arm 10 (the contact 30a or the TCP on the screw 30 shown in FIG. 11) can be converted by computations and therefore the force acting on the arbitrary site interlocked with the arm 10 can be made to reach a target force. Therefore, without being limited to the configuration shown in FIG. 11 in which the control device 40 performs force control with the target force on the TCP directly defined, control can be performed with any target force set for any site. Also, when the focus in placed on the insertion object, if the force acting in the insertion direction in the insertion hole is greater than the force acting in the direction orthogonal to the insertion direction, control to insert the insertion object into the insertion hole can be performed after the insertion object is tilted from the center axis of the insertion hole and brought into contact with the insertion hole in that state.

As described above, even when another object which obstructs the movement of the insertion object in the insertion direction comes in contact with the insertion object, the insertion object avoids this object. Since the force in the insertion direction is greater than the force in the direction orthogonal to the insertion direction, control can be performed in such a way that the insertion object is inserted into the insertion hole, avoiding another object. The period during which the insertion object is inserted into the insertion hole may be at least a part of the period from when the insertion object begins to be inserted into the insertion hole, up until the insertion is completed. For example, the period during which the screw as the insertion object is in contact with the taper of the screw hole as the insertion hole, or the like, may be employed (the same applies hereinafter).

Moreover, as a specific example of control, the control unit may include a force control unit which causes an output from a detection unit provided in the moving part to reach a target force. That is, when the moving part (or the insertion object moving with the moving part) comes in contact with another object, a force is exerted on the moving part from this object and a force is exerted on the object from the moving part. These forces are in the opposite directions and of the same magnitude. The force detection unit can detect the force exerted on the object from the moving part.

If the control unit exerts on the moving part a force for moving the moving part, consequently the force exerted on another object from the moving part can change. Thus, if the control unit controls the position or the like of the moving part, the output from the force detection unit can change. Therefore, the control unit can control the moving part in such a way that the output from the force detection unit reaches a specific target force, by controlling the position or the like of the moving part.

The force detection unit is provided in the moving part and detects a force acting on the moving part. Here, since control is performed when the insertion object moving with the moving part is inserted into the insertion hole, it is preferable that the force detected by the force detection unit is substantially equal to the force acting on the insertion object. That is, since the insertion object is substantially integrated with the moving part by suction or the like, in the configuration in which the insertion object moves with the moving part, the force detected by the force detection unit can be regarded as substantially equal to the force acting on the insertion object.

In the configuration in which force control can be executed as the control on the moving part, as described above, the force control unit may cause the force directed in the insertion direction to achieve a target force while the insertion object is inserted into the insertion hole. With this configuration, the force control unit can control the moving part in such a way that the force directed in the insertion direction acts on the insertion object via the moving part. Consequently, the moving part can be controlled in such a way that the insertion object is inserted into the insertion hole. If the output from the force detection unit is not a force exerted on another object from the moving part but a force as a reaction from another object, the direction of the target force is in the opposite direction (that is, a force directed in the direction opposite to the insertion direction).

Moreover, in the configuration in which the force directed in the insertion direction is made to reach a target force, the target force may be set in the direction orthogonal to the insertion direction. For example, a configuration may be employed in which the force control unit sets the target force in the direction orthogonal to the insertion direction to be 0 while the insertion object is inserted into the insertion hole. That is, if another object is not in contact with the moving part (or the insertion object) from the direction orthogonal to the insertion direction, the force detected by the force detection unit in the direction orthogonal to the insertion direction is 0. Therefore, in this circumstance, there is no point in setting the target force in the direction orthogonal to the insertion direction to be 0.

Meanwhile, if another object comes in contact with the moving part (or the insertion object) from the direction orthogonal to the insertion direction, a finite value ($\neq 0$) is outputted from the force detection unit as a force acting in the direction orthogonal to the insertion direction. Therefore, in the circumstance where another object is in contact with the moving part (or the insertion object) from the direction orthogonal to the insertion direction in this manner, if the target force in the direction orthogonal to the insertion direction is set to be 0, the moving part is driven in such away that the finite value is turned 0. Consequently, the moving part is controlled in such a way as to make a movement which avoids the object in contact with the moving part (or the insertion object).

When the state where another object is not in contact with the moving part (or the insertion object) from the direction orthogonal to the insertion direction is achieved by this control, the output from the force detection unit becomes 0 (that is, the target force) and the state where the control on the moving part based on the target force is not carried out is established. Therefore, since the force directed in the insertion direction has achieved the target force, in the state where the moving part (or the insertion object) is in contact with the object (taper in the screw hole or the like) obstructing the movement in the insertion direction, control is performed in such away that the insertion object is inserted gradually in the insertion direction, avoiding this object. That is, profile control in which the insertion object is inserted into the insertion hole while being in contact with the wall surface of the insertion hole, is executed.

Moreover, in the configuration in which the force directed in the insertion direction is made to reach a target force, profile control may be executed using physical quantities other than a force. For example, a configuration in which the control unit has a position control unit for moving the position of a reference site moving with the moving part to a target position can be employed. That is, when the reference site moving with the moving part is moved to a target position, position control to control the position of the moving part and the insertion object by moving the reference site to the target position is executed. The reference site is a site whose position is grasped by the control unit and which can be moved to an arbitrary position on an arbitrary coordinate system. As the reference site, various sites can be employed such as, for example, the TCP (Tool Center Position) set on the moving part, the center of gravity of the end effector, or a specific site on the insertion object (distal end of the screw or the like).

In the circumstance where such position control is possible, a configuration may be employed in which the position control unit performs control to move the position of the reference site to the target position while the insertion object is inserted into the insertion hole. With this configuration, in the state where a force directed in the insertion direction acts on the insertion object, even if the moving part (or the insertion object) comes in contact with an object which obstructs the insertion, there is a high possibility of being able to avoid the situation where the moving part (or the insertion object) stands still in contact with that object because the reference site is moved to the target position. As the insertion is carried out avoiding that object, repeating the avoidance of the object can lead to progress in the avoidance of the object and the insertion of the insertion object. In this case, it can be said that profile control is performed.

In the position control, various target positions can be set. For example, in a configuration where the target position is changed at least into a direction which is orthogonal to the insertion direction and in which there is no object obstructing the insertion of the insertion object, even if the insertion object is in contact with an object obstructing the movement of the insertion object in the insertion direction, the probability of avoiding that object can be increased. The position control may also be realized by performing control to move the moving part (or the insertion object) at a predetermined speed.

The target position in the position control may be decided by various methods. For example, in the example where a screw as an insertion object is inserted into a screw hole as an insertion hole, if a large force directed in the direction of the center of the insertion hole (in a direction at right angles to the insertion direction) acts on the screw, the screw is considered to be in contact with the taper in the screw hole. Meanwhile, if a small force directed in the direction of the center of the insertion hole acts on the screw, the screw is considered to have begun to enter the screw hole. Therefore, in the case where the force directed in the direction of the center of the insertion hole is large, if movement control to move in the direction of that force is carried out, the screw will avoid the taper. However, since a force acts in the insertion direction, the screw moves deep into the screw hole along the taper. Thus, profile control is realized. Of course, in order for profile control to be carried out in the state where the force directed in the insertion direction has reached a target force, various kinds of control can be employed. Combinations of various types of position control and speed control or the like may be employed as well.

Moreover, the speed of the position of the reference site that is set in order to move the moving part (or the insertion object) at a predetermined speed may be decided based on the product of the number of rotations per unit time of the screwdriver and the lead for the screw. The value of the product itself may be used as the speed, or the value of the product with a certain margin may be used as the speed. Various examples of the margin can be employed. For example, a value 0.5 times the product or greater and twice the product or smaller may be used as the speed. That is, if the speed is below 0.5 times the product, the insertion speed of the screw is slow, resulting in low efficiency and increasing the probability of failure in the insertion of the screw. Meanwhile, if the speed is above twice the product, the force acting on the screw and the screw hole increases and the probability of failure in the insertion of the screw increases as well. The unit time may be a second or a minute. Various units can be employed.

The entire disclosure of Japanese Patent Application Nos. 2016-147092, filed Jul. 27, 2016 and 2017-081131, filed Apr. 17, 2017 are expressly incorporated by reference herein.

What is claimed is:

1. A control device which controls a robot having a moving part, the control device comprising:
a processor configured to cause an end effector provided on the moving part to move an insertion object, bring the insertion object into contact with an insertion hole provided in the insertion target object in a state where the insertion object is tilted from a center axis of the insertion hole, and subsequently insert the insertion object into the insertion hole, wherein
the processor is configured to move a position of a reference site moving with the moving part to a target position, and control to move the position of the reference site to the target position while the insertion object is inserted into the insertion hole,
the end effector includes a screwdriver,
the insertion object is a screw attached to the screwdriver, and
the processor is configured to move the position of the reference site in the insertion direction at a speed which is set based on a product of a number of rotations per unit time of the screwdriver and a lead for the screw.

2. The control device according to claim 1, wherein
a force acting on the insertion object in an insertion direction in the insertion hole while the insertion object is inserted into the insertion hole is greater than a force acting in a direction orthogonal to the insertion direction.

3. The control device according to claim 2, wherein
the processor which is configured to cause an output from a force detection unit provided in the moving part to reach a target force, and cause the force direction in the insertion direction to reach the target force while the insertion object is inserted into the insertion hole.

4. The control device according to claim 3, wherein
the processor which is configured to cause the target force in the direction orthogonal to the insertion direction to become 0 while the insertion object is inserted into the insertion hole.

5. The control device according to claim 1, wherein
the processor which is configured to start control to insert the insertion object into the insertion hole after moving a reference site moving with the moving part to a suggested position,
the suggested position is set to a position displaced in a displacement direction from a center of the insertion hole,
the center of the insertion hole is a center in the case where the insertion hole is viewed in a line-of-sight direction parallel to the center axis, and
the displacement direction is a direction in which an end part on the side of the insertion hole of the insertion object tilts from the center axis.

* * * * *